Oct. 31, 1967     C. H. SCHWARTZ ETAL     3,349,412
GASKET FERRULE
Filed March 19, 1964
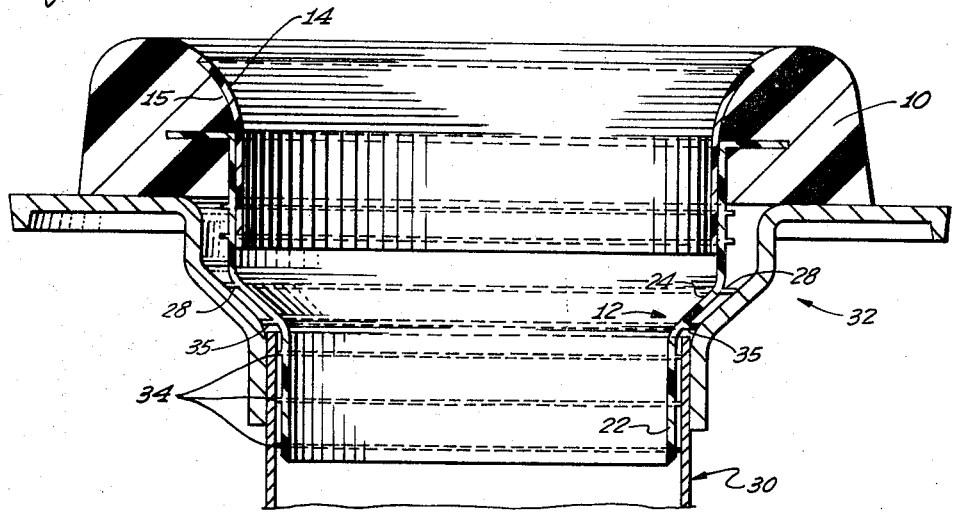
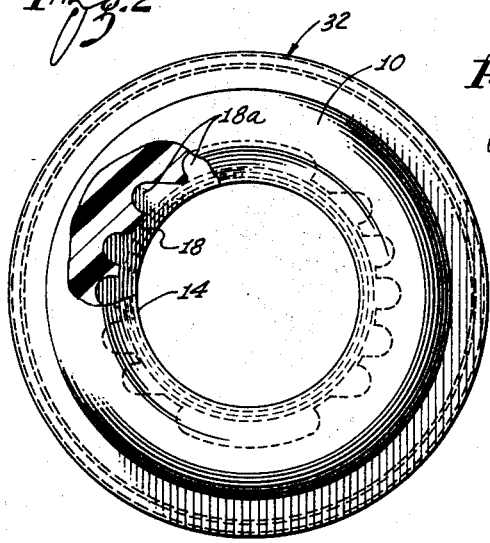
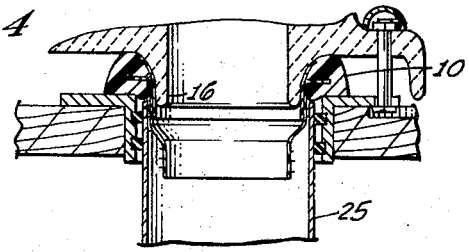
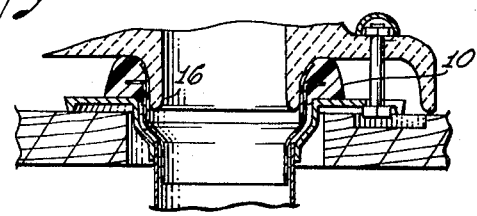
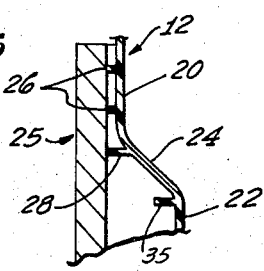
INVENTORS
Charles H. Schwartz
George F. Smyth
By Smyth, Roston & Pavitt
Attorneys

United States Patent Office 3,349,412
Patented Oct. 31, 1967

3,349,412
GASKET FERRULE
Charles H. Schwartz and George F. Smyth, Los Angeles, Calif., assignors to De Best Manufacturing Co., Inc., Gardena, Calif., a corporation of California
Filed Mar. 19, 1964, Ser. No. 353,124
8 Claims. (Cl. 4—252)

This invention relates to a well known type of gasket for sealing the connection between a toilet bowl outlet and a soil pipe that extends upward through a floor. More particularly, the invention refers to a gasket for this purpose that comprises a ring of wax-like material to embrace the toilet bowl outlet horn and a ferrule of chemically inert plastic material that extends downward from the wax-like ring for sealing contact with the inner surface of the soil pipe.

A problem to which the invention is directed is to prevent deterioration of the inner circumferential region of the wax-like ring over a long service period, which deterioration is especially likely to occur when the outlet horn of the toilet bowl is relatively short.

It has been discovered that there are two reasons for such deterioration. One reason is that with the wax-like substance of the sealing ring exposed to waste materials and to chemicals that are commonly used in toilet bowls, the wax-like material is locally corroded. The other reason is that with the upper end portion of the plastic ferrule embedded in the inner circumferential region of the wax-like ring, the embedded portion of the ferrule weakens the wax-like ring and tends to cause cleavage, cracks and fissures into which the corrosive substances may penetrate.

The invention meets this particular problem by adding a sleeve of chemically inert plastic material to serve as a liner for the vulnerable portion of the wax-like ring and to serve the further purpose of reinforcing the wax-like ring against stresses created by the embedded portion of the plastic ferrule. The added liner conforms to the flared configuration of the inner circumference of the wax-like ring and the lower portion of the liner telescopes into the upper portion of the plastic ferrule. The liner is not only bonded to the wax-like ring above the embedded portion of the plastic ferrule but is also bonded to the inner surface of the plastic ferrule below the embedded portion. Thus the plastic liner not only covers the zone of the embedded portion of the ferrule where cracks and cleavage tend to occur but also for the purpose of reinforcement, structurally interconnects the regions of the wax-like ring on the opposite sides of the cleavage zone.

A second feature of the invention concerns the fact there are commonly two different sizes of soil pipe. The largest size is a cast iron soil pipe which terminates at approximately floor level and is surrounded by a flanged metal collar. The smaller size is a copper soil pipe that terminates slightly below floor level and is embraced by a flanged collar of flared configuration that extends upward to floor level. Because of these two different pipe sizes, it has heretofore been necessary to manufacture and stock two different sealing gaskets. The present invention reduces cost and promotes convenience by providing a single model of a gasket that will cooperate with either sizes of soil pipe in a sealing manner.

The features and advantages of the invention may be understood from the following detailed description together with the accompanying drawing.

In the drawing, which is to be regarded as merely illustrative:

FIG. 1 is a sectional view of the presently preferred embodiment of the invention showing how the sealing gasket cooperates with a copper soil pipe that it is somewhat smaller in diameter than a cast iron soil pipe;

FIG. 2 is a plan view of the sealing gasket on a reduced scale with a portion broken away to reveal concealed structure;

FIG. 3 is a sectional view on a smaller scale showing how the outlet horn of a toilet bowl telescopes into the sealing gasket shown in FIG. 1;

FIG. 4 is a view similar to FIG. 3 showing how the sealing gasket cooperates with a cast iron soil pipe; and FIG. 5 is an enlarged fragment of FIG. 4.

Referring to FIG. 1, the parts of the gasket comprise a sealing ring 10 of wax-like material, a ferrule 12 of chemically inert plastic material, and a liner 14 that is also made of chemically inert plastic material.

As may be seen in FIG. 1 the inner circumferential surface of the wax-like ring 10 is curved in profile to form a rounded flared inner rim 15 to conform with the configuration of an outlet horn of a toilet bowl, such an outlet horn being shown at 16 in FIGS. 3 and 4. The plastic ferrule 12 is shaped with a radial flange 18 at its upper end which, as indicated in FIG. 2, may be cut away to form a series of radial tongues 18a. The radial flange 18 of the plastic ferrule is embedded in the wax-like ring 10 in a circumferential zone that is intermediate the two opposite faces of the ring. The plastic ferrule 12 is of stepped configuration having an upper circumferential portion 20 of relatively large diameter, a lower circumferential portion 22 of smaller diameter and an intermediate portion 24 which provides a transition between the two diameters.

The upper portion 20 of the plastic ferrule is dimensioned to telescope into a cast iron soil pipe 25 shown in FIG. 4 and, as best shown in FIG. 5, is formed with two spaced circumferential flanges or lips 26 for sealing contact with the inner circumferential surface of the cast iron soil pipe. Also as best shown in FIG. 5 the intermediate portion 24 of the plastic ferrule 12 is formed with a integral outer circumferential flange or lip 28 for additional sealing contact with the inner surface of the cast iron soil pipe 25.

As shown in FIGS. 1 and 3, a copper soil pipe 30 is conventionally provided with a flanged collar 32 of flared configuration which embraces the end of the pipe. The copper soil pipe 30 terminates below the floor level and the flared collar 32 extends upward approximately to floor level.

As best shown in FIG. 1, the lower portion 22 of the plastic ferrule 12 is dimensioned to telescope into the end of the copper soil pipe 30 and the intermediate portion 24 of the ferrule conforms in general to the flared configuration of the collar 32. The lower portion 22 of the ferrule is formed with at least one outer circumferential flange or lip for sealing contact with the inner surface of the copper soil pipe 30. In this instance the lower portion 22 of the plastic ferrule is formed with three spaced outer circumferential flanges or lips 34.

A feature of the invention is that the previously mentioned outer flange or lip 28 of the intermediate portion 24 of the plastic ferrule is dimensioned not only to make sealing contact with the inner circumference of the cast iron soil pipe 25 as shown in FIG. 5 but also to make sealing contact with the flared portion of the flared collar 32 as shown in FIG. 1. In addition, the intermediate portion 24 of the plastic ferrule is formed with a second outer circumferential flange or lip 35 which also makes sealing contact with the flared portion of the flared collar 32 as may be seen in FIG. 1.

The previously mentioned liner 14 conforms to the inner circumferential surface of the wax-like ring 10 and is flared to follow the curvature of the inner rim 15 of the ring. Preferably, as shown in FIG. 1, the inner surface of the liner is flush with the inner surface of the wax-like ring 10 at the upper end of the liner.

As best shown in FIG. 1, the liner 14 extends above the exposed portion of the plastic ferrule 12 and the lower portion of the liner telescopes snugly into the upper circumferential portion 20 of the liner. The liner 14 is bonded to the wax-like ring 10 above the plastic ferrule 12 and is additionally bonded to the plastic ferrule below the upper end of the ferrule. Thus the liner 14 not only serves to protect the inner circumferential surface of the wax-like ring 10 from corrosion substances but in addition bridges and, in effect, interconnects the two regions of the ring that lie above and below the embedded flange of the ferrule. In this manner, the liner 14 reinforces the wax-like ring against cleavage in the zone of the embedded flange 18 of the ferrule.

The manner in which the invention serves its purpose may be readily understood from the foregoing description. It is apparent that the one sealing device cooperates with equal effectiveness with either a cast iron soil pipe of relatively large diameter or a copper soil pipe of smaller diameter. It is to be noted that in each instance there are at least three outer circumferential flanges or lips of the liner positioned and dimensioned for sealing contact with the inner circumferential surface of the soil pipe. Thus, as shown in FIG. 5, there are two outer circumferential flanges or lips 26 and a third outer circumferential flange or lip 28 in contact with the inner surface of the cast iron soil pipe 25 and in FIG. 1 there are three outer circumferential flanges or lips 34 in sealing contact with the interior of the copper soil pipe 30. In FIG. 1 there is also an additional pair of outer circumferential flanges or lips 28 and 35 in sealing contact with the flared portion of the flanged collar 32.

When the sealing device is installed as shown in FIGS. 3 and 4, the liner 14 prevents any portion of the wax-like ring 10 from being exposed to the fluids from the toilet bowl outlet and since both the liner 14 and the ferrule 12 are made of chemically inert plastic material, the sealing device is effective over an extended service life.

Our description in specific detail of the selected embodiment of the invention will suggest various changes, substitutions and other departures from our disclosure within the spirit and scope of the appended claims.

We claim:

1. In a device for sealing the connection between a toilet bowl outlet and the upper end of a soil pipe that is surrounded by a flanged collar, wherein the device includes a ring of wax-like material to embrace the toilet bowl outlet in abutment with the upper surface of the flanged collar and further includes a ferrule of chemically inert plastic material attached to the ring and extending downward therefrom for sealing engagement with the interior of the soil pipe, the improvement comprising:

the ferrule being of stepped configuration with an upper circumferential portion of relatively large diameter to fit into a cast iron soil pipe of relatively large diameter and a lower circumferential portion of smaller diameter to fit into a smaller copper soil pipe, whereby the sealing device may be used with the two sizes of soil pipe interchangeably, the upper circumferential portion of the ferrule having at least one integral outer circumferential flange for sealing engagement with the inner surface of the larger soil pipe.

the lower circumferential portion of the ferrule having at least one integral outer circumferential flange for sealing engagement with the inner surface of the smaller soil pipe.

2. The improvement set forth in claim 1 in which the two portions of the ferrule are each formed with at least two spaced integral outer circumferential sealing flanges.

3. In a device for sealing the connection between a toilet bowl outlet and the upper end of a cast iron soil pipe of relatively large diameter that extends approximately to floor level and is surrounded by a flanged collar or as an alternative for cooperation with a smaller copper soil pipe that terminates below floor level and is surrounded by a flanged collar that extends upward therefrom to approximately floor level, the second mentioned flanged collar having a lower portion of relatively small diameter embracing the copper soil pipe and bonded thereto, the second mentioned flanged collar further having an upper portion of relatively large diameter and a flared intermediate portion, the improvement comprising:

the ferrule being of stepped configuration for cooperation with the two sizes of soil pipe interchangeably, the ferrule having an upper circumferential portion of relatively large diameter to fit into the larger soil pipe, an intermediate circumferential portion and a lower circumferential portion of smaller diameter to fit into the smaller soil pipe, the upper circumferential portion of the ferrule being formed with at least one integral outer circumferential flange for sealing engagement with the inner circumferential surface of the larger pipe, the flared intermediate circumferential portion of the ferrule being formed with at least one outer circumferential flange dimensioned for sealing engagement with the inner circumferential surface of the flared intermediate portion of the second mentioned flanged collar, the lower circumferential portion of the ferrule being formed with at least one outer circumferential flange for sealing engagement with the inner surface of the smaller soil pipe.

4. The improvement set forth in claim 3 in which the outer circumferential flange of the intermediate circumferential portion of the ferrule is dimensioned and located for sealing contact with the inner surface of the larger cast iron soil pipe.

5. The improvement set forth in claim 3 in which each of the three circumferential portions of the ferrule is formed with two spaced integral outer circumferential sealing flanges, the first, second and third of the six outer circumferential sealing flanges being dimensioned and located for sealing contact with the inner circumferential surface of the larger cast iron pipe, the third, fourth, fifth and sixth of the six outer circumferential sealing flanges being dimensioned and located for sealing contact with the inner circumferential surface of the second mentioned flanged collar and the inner circumferential surface of the smaller soil pipe.

6. In a device for sealing the connection between a toilet bowl outlet and the upper end of a cast iron soil pipe of relatively large diameter that extends approximately to floor level and is surrounded by a flanged collar or as an alternative for cooperation with a smaller copper soil pipe that terminates below floor level and is surrounded by a flanged collar that extends upward therefrom to approximately floor level, and second mentioned flanged collar having a lower portion of relatively small diameter embracing the copper soil pipe, the second mentioned flanged collar further having an upper portion of relatively large diameter and a flared intermediate portion, the improvement comprising:

the ferrule being of stepped configuration for cooperation with the two sizes of soil pipe interchangeably, the ferrule having an upper circumferential portion of relatively large diameter to fit into the larger soil pipe, an intermediate circumferential portion and a lower circumferential portion of smaller diameter to fit into the smaller soil pipe, the upper circumferential portion of the ferrule being formed with at least one integral outer circumferential flange for sealing engagement with the inner circumferential surface of the larger pipe, the lower circumferential portion of the ferrule being formed with at least one outer circumferential flange for sealing engagement with the inner surface of the smaller soil pipe, the upper end portion of the ferrule being embedded in the wax-like ring in a circumferential zone thereof spaced below the upper side of the ring; and the additional provision of a sleeve of chemically inert plastic material lining the upper portion of the inner circumferential surface of the ring, the sleeve telescoping into the upper part of the ferrule for reinforcement thereof, the sleeve being bonded to the wax-like ring above the embedded upper end portion of the ferrule and being further bonded to the ferrule below the embedded portion.

7. In a device for sealing the connection between a toilet bowl outlet and the upper end of a cast iron soil pipe of relatively large diameter that extends approximately to floor level and is surrounded by a flanged collar or as an alternative for cooperation with a smaller copper soil pipe that terminates below floor level and is surrounded by a flanged collar that extends upward therefrom to approximately floor level, the second mentioned flanged collar having a lower portion of relatively small diameter embracing the copper soil pipe, the second mentioned flanged collar further having an upper portion of relatively large diameter and a flared intermediate portion, the improvement comprising:

the ferrule being of stepped configuration for cooperation with the two sizes of soil pipe interchangeably, the ferrule having an upper circumferential portion of relatively large diameter to fit into the larger soil pipe, an intermediate circumferential portion and a lower circumferential portion of smaller diameter to fit into the smaller soil pipe, the upper circumferential portion of the ferrule being formed with at least one integral outer circumferential flange for sealing engagement with the inner circumferential surface of the larger pipe, the intermediate circumferential portion of the ferrule being formed with at least one outer circumferential flange for sealing engagement with the inner surface of the flared intermediate portion of the second mentioned flanged collar, the lower circumferential portion of the ferrule being formed with at least one outer circumferential flange for sealing engagement with the inner surface of the smaller soil pipe, the upper end portion of the ferrule being embedded in the wax-like ring in a circumferential zone thereof spaced below the upper side of the ring, the ferrule extending downward from its embedded portion over the inner circumferential surface of the ring; and the additional provision of a sleeve of chemically inert plastic material lining the upper portion of the inner circumferential surface of the ring, the sleeve telescoping into the upper part of the ferrule for reinforcement thereof, the sleeve being bonded to the wax-like ring above the embedded upper end portion of the ferrule and being further bonded to the ferrule below the embedded portion whereby the sleeve reinforces the wax-like ring against cleavage in the zone of the embedded portion of the ferrule.

8. In a device for sealing the connection between a toilet bowl outlet horn and the upper end of a soil pipe, wherein the device includes a ring of wax-like material with a rounded flared inner rim to embrace the outlet horn and further includes a ferrule of chemically inert yieldable plastic material, the upper end of the ferrule being embedded in the ring in a zone spaced below the upper side of the ring, the remaining portion of the ferrule extending downward against the inner circumferential surface of the ring and below the ring for sealing engagement with the inner surface of the soil pipe, the improvement comprising:

a sleeve of chemically inert plastic material lining the upper portion of the inner circumferential surface of the wax-like ring and flared to conform to the configuration of the flared inner rim of the ring, the sleeve telescoping into the upper part of the ferrule for reinforcement thereof, the sleeve being bonded to the wax-like ring above the embedded upper end of the ferrule and being further bonded to the ferrule below the embedded portion whereby the sleeve reinforces the wax-like ring against cleavage in the zone of the embedded portion of the ferrule.

References Cited
UNITED STATES PATENTS

| 2,750,216 | 6/1956 | Thies | 4—252 |
| 2,976,543 | 3/1961 | Turner et al. | 277—208 X |
| 3,037,212 | 6/1962 | Kleinhof | 4—252 |
| 3,148,895 | 9/1964 | Jasper et al. | 285—7 |

LAVERNE D. GEIGER, *Primary Examiner.*

J. S. MEDNICK, *Assistant Examiner.*